US010500678B2

(12) United States Patent
Dong et al.

(10) Patent No.: US 10,500,678 B2
(45) Date of Patent: Dec. 10, 2019

(54) METHOD FOR PRODUCING DRILLED COOLING HOLES IN A GAS TURBINE ENGINE COMPONENT

(71) Applicant: XIAMEN UNIVERSITY, Xiamen (CN)

(72) Inventors: Yiwei Dong, Xiamen (CN); Yancheng You, Xiamen (CN); Chunping Yin, Xiamen (CN); Xiaoji Li, Xiamen (CN); Qi Zhao, Xiamen (CN); Ertai Wang, Xiamen (CN); Zongpu Wu, Xiamen (CN)

(73) Assignee: XIAMEN UNIVERSITY, Xiamen (CN)

(*) Notice: Subject to any disclaimer, the term of this patent is extended or adjusted under 35 U.S.C. 154(b) by 172 days.

(21) Appl. No.: 15/725,816

(22) Filed: Oct. 5, 2017

(65) Prior Publication Data

US 2018/0099360 A1 Apr. 12, 2018

Related U.S. Application Data

(60) Provisional application No. 62/404,877, filed on Oct. 6, 2016.

(51) Int. Cl.
  *B23K 26/382* (2014.01)
  *B23K 26/384* (2014.01)
  (Continued)

(52) U.S. Cl.
  CPC ............ *B23K 26/389* (2015.10); *B21D 53/78* (2013.01); *B23H 9/10* (2013.01); *B23K 26/384* (2015.10);
  (Continued)

(58) Field of Classification Search
  CPC ......... B23H 9/14; F01D 5/186; G05B 19/401; B23K 26/384
  See application file for complete search history.

(56) References Cited

U.S. PATENT DOCUMENTS 4,811,253 A * 3/1989 Johns .................... G05B 19/401
33/546
5,418,345 A * 5/1995 Adamski .................. B23H 9/10
219/121.71
(Continued)

FOREIGN PATENT DOCUMENTS

EP 2719494 A1 * 4/2014 ............. F01D 5/186
JP 2004283998 A * 10/2004

*Primary Examiner* — Jacob J Cigna
(74) *Attorney, Agent, or Firm* — Cooper Legal Group, LLC

(57) ABSTRACT

A method for accurately producing the drilled hole in a wall of a component fabricated by investment casting process, such as for use in a blade or steam turbine includes the following steps. The 3D data of actual component is obtained from the measurements or from the numerical simulation. The actual model and the ideal model are aligned and compared, a series of cutting planes are given to establish a series of 2D cross-sections of the actual and ideal models after registration. Each cross-section is dispersed into discrete points, the distance between each corresponding points are calculated and formed into 2D displacement. The accurate parametric model consisting of the depth, hole center, and the nominal vector is obtained on the basis of considering the deviations in geometrical and positional values. The drilled hole is then produced according to the corrected parametric drilled-hole geometrical and positional value.

19 Claims, 6 Drawing Sheets

(51) Int. Cl.
  *B21D 53/78* (2006.01)
  *B23H 9/10* (2006.01)
  *F01D 5/18* (2006.01)
  *G05B 19/04* (2006.01)

(52) U.S. Cl.
  CPC ............ *F01D 5/186* (2013.01); *G05B 19/041* (2013.01); *B23P 2700/06* (2013.01); *F05B 2200/11* (2013.01); *F05B 2220/302* (2013.01); *F05B 2230/103* (2013.01); *F05B 2250/29* (2013.01); *F05B 2260/202* (2013.01)

(56) References Cited

U.S. PATENT DOCUMENTS

| | | | | |
|---|---|---|---|---|
| 5,485,390 A * | 1/1996 | LeClair | ............... | G05B 19/4097 700/182 |
| 6,339,879 B1 | 1/2002 | Wheat et al. | | |
| 6,380,512 B1 * | 4/2002 | Emer | ...................... | B23K 26/04 219/121.71 |
| 6,490,499 B1 * | 12/2002 | Duffin | ................... | B23K 26/08 700/166 |
| 6,610,961 B1 * | 8/2003 | Cheng | ................. | B23K 26/04 219/121.71 |
| 6,611,731 B2 * | 8/2003 | Duffin | ................... | B23B 39/00 700/187 |
| 6,959,572 B2 * | 11/2005 | Lawrence | ................ | B21D 3/10 72/296 |
| 7,310,588 B2 * | 12/2007 | Mentz | .................... | G01B 21/20 702/155 |
| 7,869,899 B2 * | 1/2011 | Hammond | .............. | B23P 6/002 700/194 |
| 8,212,179 B2 * | 7/2012 | Luketic | ................. | B23K 26/03 219/121.71 |
| 8,218,001 B2 * | 7/2012 | Hastilow | .............. | G05B 19/401 348/92 |
| 8,397,394 B2 * | 3/2013 | Hildebrand | .......... | G05B 19/401 33/503 |
| 8,414,264 B2 * | 4/2013 | Bolms | .................... | F01D 5/005 219/121.71 |
| 9,302,345 B2 * | 4/2016 | Hu | ........................ | B23K 26/04 |
| 10,060,268 B2 * | 8/2018 | Bradshaw | ............... | F01D 5/186 |
| 2003/0004606 A1 * | 1/2003 | Duffin | .................... | B23B 39/00 700/193 |
| 2004/0236787 A1 * | 11/2004 | Bohn | ................ | G05B 19/41805 |
| 2004/0267391 A1 * | 12/2004 | Bohn | .................. | G05B 19/4097 700/97 |
| 2006/0229759 A1 * | 10/2006 | Luketic | ................. | B23K 26/03 700/166 |
| 2007/0107180 A1 * | 5/2007 | Mentz | .................... | G01B 21/20 29/407.05 |
| 2008/0183325 A1 | 7/2008 | Kriegmair | | |
| 2009/0112357 A1 * | 4/2009 | Hammond | .............. | B23P 6/002 700/194 |
| 2009/0213216 A1 * | 8/2009 | Hastilow | .............. | G05B 19/401 348/142 |
| 2013/0071255 A1 * | 3/2013 | Yokoyama | .............. | F01D 5/186 416/97 R |

* cited by examiner

METHOD FOR PRODUCING DRILLED COOLING HOLES IN A GAS TURBINE ENGINE COMPONENT

CROSS REFERENCE TO RELATED APPLICATIONS

This non-provisional application claims the benefit under 35 U.S.C. § 119(e) to U.S. Provisional Application No. 62/404,877 filed in the United States on Oct. 6, 2016, the entire contents of which are hereby incorporated by reference.

FIELD OF THE INVENTION

The present invention relates to a method for producing the drilled holes with accurate geometrical and positional parameters of an air-cooled components, in particular for the production of film cooling holes with accurate geometrical and positional values in a blade of a gas or steam turbine. Preferably in an aero-engine hollow turbine blade with multiple drilled holes introduced to ensure proper cooling air flow through the cooling holes.

BACKGROUND OF THE INVENTION

To achieve high levels of efficiency with a high output at the same time, gas turbines are operated with an extremely high inlet temperature, which often exceeds the permissible material temperature of turbine blading. It is essential to strengthen the bearing working temperature ability of the turbine blade, and to use certain cooling strategies to make it possible nevertheless for the blades to be operated reliably and with long life-time. Development in cooling technique resulted in complicated cooling scheme, multiple ($10^4$-$10^6$) fine-shaped holes (0.3-1.2 mm) with divergent oblique angles)(10°-75° exist on such air-cooled components in which cooling air flows through the airfoil and discharged through cooling holes. Consequently, the flow of the cooling fluid as a film is determined considerably by the shape and location of the hole, which means the cooling holes need to be straight, accurate, and exactly positioned. For example, diametrical tolerances for air-cooled holes are generally on the order of approximately ±0.002 inch (±0.05 mm) or less.

A wide variety of methods in the state-of-art for producing drilled cooling holes for gas turbine blades, for instance, or in other embodiments, precision drilling techniques such as the laser beam machining, the electrical discharge machining (EDM), and the electrical discharge machining (ECM), etc., are typically used to producing the holes. Specifically, ultrashort pulsed lasers for developing in cooling holes drilling applications with minimized recast layer and negligible heat-affected zone are widely used.

Although the methods for cooling holes drilling known from the state of art have a significant performance on drilling the holes with high efficiency, trial-and-error methods are still implemented in drilling operations. Firstly it is because the actual wall thickness at the designed location of drilled holes deviates from the ideal wall thickness due to the fact that the components such as gas turbine blades with intricate geometry and tight tolerances are often fabricated by investment casting, which is a multiplex nonlinear physical processes coupled with geometry, material properties and boundary conditions. The component, in the embodiment of gas turbine blades, the dimensions produced exhibit non-uniform deformation due to the deformation of wax pattern, expansion of shell, and alloy shrinkage. In addition, holding a thin-walled components such as blades with sculptured surfaces firmly depends on the fixture. Once the turbine blade is localized thoroughly, and restrained by the locators and clamp of the fixture, the component is processed to generate drilled holes with geometric features according to the cooling requirements. In general, the hole feature may have deviation in terms of the localization error. Furthermore, the deviation may occur when clamping the component in the machining process, including the movement and deformation of the component, etc.

As is apparent from the deviations of the ideal drilled holes features discussed above regarding the geometries and positions of drilled hole, the defects such as the occurrence of blind holes, laser burns on the opposite wall, as well as the lack of consistency accuracy of holes. This causes a change in the through-flow of the cooling fluid in comparison with the intended through-flow.

Document U.S. Pat. No. 0,229,759A1 describes a method for the parametric production of a drilled hole in a component, particularly in a gas turbine blade, comprising the steps of: Measuring an actual wall thickness of the component at the location of drill hole; Adjusting the wall thickness on the basis of adjusted parametric drilled hole geometrical value according to measurement. As such, the actual wall thickness of drilled holes can be determined based on the corrected value.

Document U.S. Pat. No. 0,183,325 A1 discloses a method for producing holes in a component, in particular of turbo-machines. The method utilizes 3D model of the actual geometry of the component, adopting each hole on the basis of actual geometry, then the production program is generated for each individual hole. As a result, the process quality and the quality of the holes can be improved.

Document U.S. Pat. No. 6,339,879 B1 teaches a method of sizing and forming a cooling hole in a gas turbine engine component. The method generally entails drilling a hole in the surface of a component, then measuring the thickness of the recast layer surrounding the hole. The thickness of the additive layer of the diffusion coating that will deposit on a corresponding recast surface of the component can be predicted based on an inverse relationship determined by the measured thickness of the recast layer during drilling process. As a result, an appropriately-oversized hole can then be formed in the component.

Although these documents teach various methods for producing drilled hole or drilled holes in a gas turbine blade, or the like, there is no intent to establish, or knowledge about the method for producing drilled holes parametrically in a gas turbine engine component with accurate geometrical and positional values with the consideration of the deviations generated before and after machining.

In view of the above, it would be desirable if an improved process were available for producing the cooling holes of gas turbine engine components with the accurate geometrical and positional parameters.

SUMMARY OF THE INVENTION

Accordingly, it is therefore an object of the invention to solve the problem mentioned above. To provide a method for the production of a drilled hole in a component parametrically, it being intended that the drilled hole produced should correspond to predetermined geometries and positions to reach the achieve pre-established cooling airflow conditions. In particular, this method is suitable for producing an air-cooled drilled cooling hole in a component of a gas or steam turbine, preferably in a blade of a gas or steam turbine in an accurate manner.

The present invention provides a method entails producing the drilled holes in a surface region of a substrate. In accordance with this method, a component is formed by investment casting process, determining the surface error of the component generated during the process, modeling the deformation characteristics of the surface error, including shrinkage, bending, and torsion; then fixing the component by fixture system, calculating the deviation resulted from the transformation of the reference frame of the component, and calculating the deviation caused by clamping deformation. During the component drilling process, predicting the deformation due to the drilling force. As such, the surface deviation, comprising the component manufacturing error, locating positional error, clamping deformation, drilling error can be determined. As a result, the geometrical and positional parameters describing actual values of drilled holes can be determined parametrically. Knowing the actual parameters of drilled holes, an appropriately cooling performance can be achieved in the component accurately.

The method according to the invention is suitable in particular for producing drilled holes in a component of gas turbine parametrically, preferably in a blade of a gas or steam turbine. Furthermore, the process of this invention is useful for newly manufactured gas turbine blade and presumably for repaired ones, wherein the drilled holes required accurate geometries and positions. As a result, a notable advantage of the present invention is that it succeeds in maintaining required cooling requirement while significantly reducing the necessary labor and time to producing cooling holes due to trial-and-error method widely adopted nowadays.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE PREFERRED INVENTION

Figure 1:
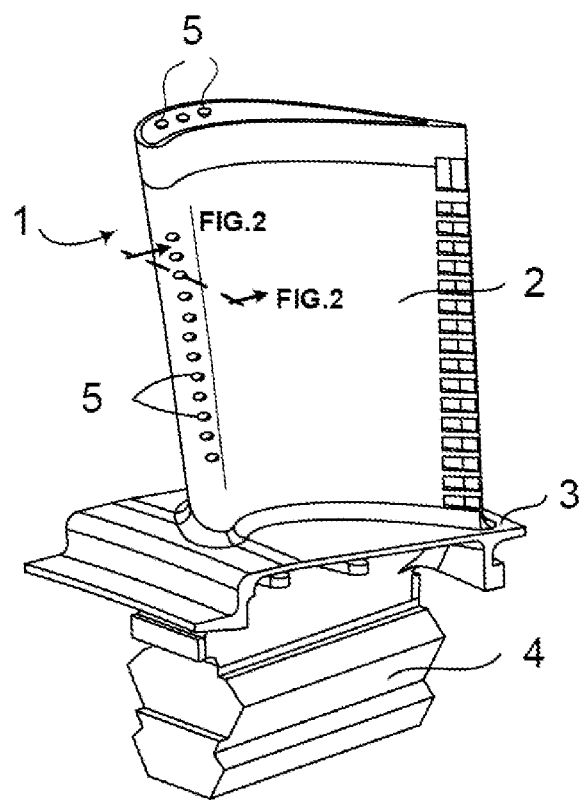
FIG. 1 is an isometric view of a high pressure turbine blade with surface cooling holes.

The present invention will be described in reference to a high pressure gas turbine blade [1] illustrated in FIG. 1 typically formed of a nickel-based super-alloy. The high pressure gas turbine blade [1] includes an airfoil section [2] and a blade platform [3], which are encounter the hot combustion gases. The cooling holes [5] need to be developed on the airfoil section [2] so as to attempt to cover the high pressure gas turbine blade [1] that is to be cooled and in its way shield them from the hot gas. The airfoil section [2] and the blade platform [3] are anchored to a turbine disk (not shown) with a blade tenon [4] formed on a root section of the high pressure gas turbine blade [1]. Since the effectiveness of the cooling depends significantly on the geometrical and positional values of the drilled holes, which means the cooling holes [5] on airfoil section [2] need to be straight, accurate, and exactly positioned. The cooling holes [5] may be produced by various well-developed techniques, for instance, the electro-discharge machining (EDM) method, which is a well tested technology for producing high-aspect-ratio micro-holes on metal materials. Another prevalent method for producing cooling holes [5] is laser beam machining, specifically, ultrashort pulsed lasers have been developing in micro-drilling applications which demonstrated great advantages of minimized recast layer and negligible heat-affected zone.

Figure 2:
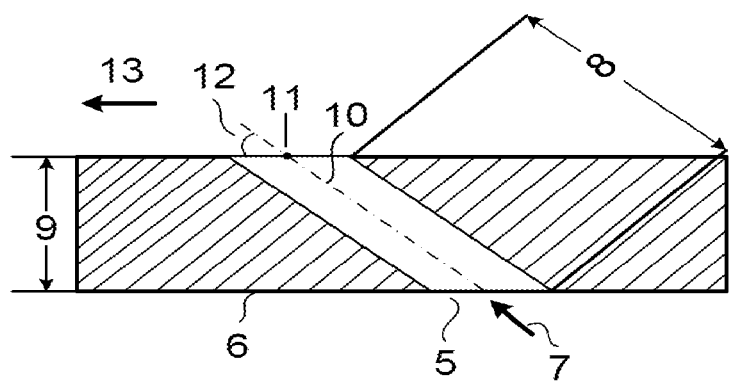
FIG. 2 shows a cross section through a wall of a gas turbine blade with a drilled cooling hole.

According to this invention, the airfoil section [2] with cooling holes [5] through a wall [6] of the high pressure gas turbine blade [1] section is shown in FIG. 2. The high pressure gas turbine blade [1] represented here is hollow on the inside. The hollow space in the turbine blade is fed with cooling air from one of the front compressor stages via feeding lines. During operation, the hot fluid flow coming from the combustion chamber (not shown) flows on the outer side of the high pressure gas turbine blade [1] according to the flow arrow [13].

In the case of a drilled cooling holes [5] that is to be produced, the cooling holes [5] comprises in the direction of flow [7] of the cooling fluid an supply section [8], and a diffuser section (not shown) adjoining the supply section [8]. For noncircular cooling hole, the supply section [8] and diffuser section have different cross-sections to obtain cooling efficiency improvement. Since the circular drilled hole cross-sections can be produced more easily from a production engineering viewpoint than noncircular drilled hole cross-sections, moreover, the noncircular cooling hole is the circular cooling hole evolution of the through-flow characteristics at the inlet region, which make the circular holes the most representative types of the drilled holes. In one embodiment, the supply section [8] and the diffuser section may also, have a constant cross-section. In an effort to provide a concise description of the embodiment, the embodiments for producing noncircular cooling holes may not be described in the specification. It is contemplated that a variety of holes with different shapes and sizes can be accurately formed using the processes disclosed herein.

Here in FIG. 2, the wall [6] has a nominal thickness [9], T. The supply section [8] with the length L, perpendicularly to its axis [10], has a circular cross-section of the diameter D, the center noted $P_c$, which is also represented the hole center [11] of the cooling holes [5]. The open angle of the diffuser [12] a, determines the flow direction of the cooling fluid through the cooling holes [5].

However, the geometrical and positional values of the cooling holes [5] deviate from the ideal values, deviations of the actual cooling holes [5] from the ideal values hole also occur and, as a consequence, in some cases considerable changes of the through-flow characteristics of the drilled cooling hole occur, even in the case of deviations are within the production tolerances. For example, the length of the supply section [8] which represents the depth of the hole L given here as a specified value may be changed. The occurrence of the deviations are owing to two obvious seasons: Firstly, due to the high pressure gas turbine blade [1] with intricate geometry and tight tolerances are often fabricated by investment casting, which is a multiplex nonlinear physical processes coupled with geometry, material properties and boundary conditions. Therefore, the turbine blade dimensions produced exhibit non-uniform deformation due to the deformation of wax pattern, expansion of shell, and shrinkage of super-alloy. Secondly, holding a thin-walled high pressure gas turbine blade [1] with sculptured surfaces firmly depends on the manufacturing fixture. Fixture system is used to establish the datum reference frame of the surface of turbine blade to be processed with respect to the reference frame of a drilling tool. Once the high pressure gas turbine blade [1] is localized thoroughly, and restrained by the locators and clamp of the fixture, the high pressure gas turbine blade [1] is processed to generate cooling holes [5] with geometric features according to the cooling requirements. In general, the cooling holes [5] feature may have geometric errors in terms of its form and position related to the component datum reference frame. If there exists a misalignment error between the component datum reference frame and drilling tool reference frame, also known as localization error. A localization error is essentially caused by a deviation in the position of the contact point between a locator and the component surface from its nominal specification, and it plays an important role in the deviation of the airfoil section [2] besides the geometrical and positional values of the cooling holes [5].

Figure 3:
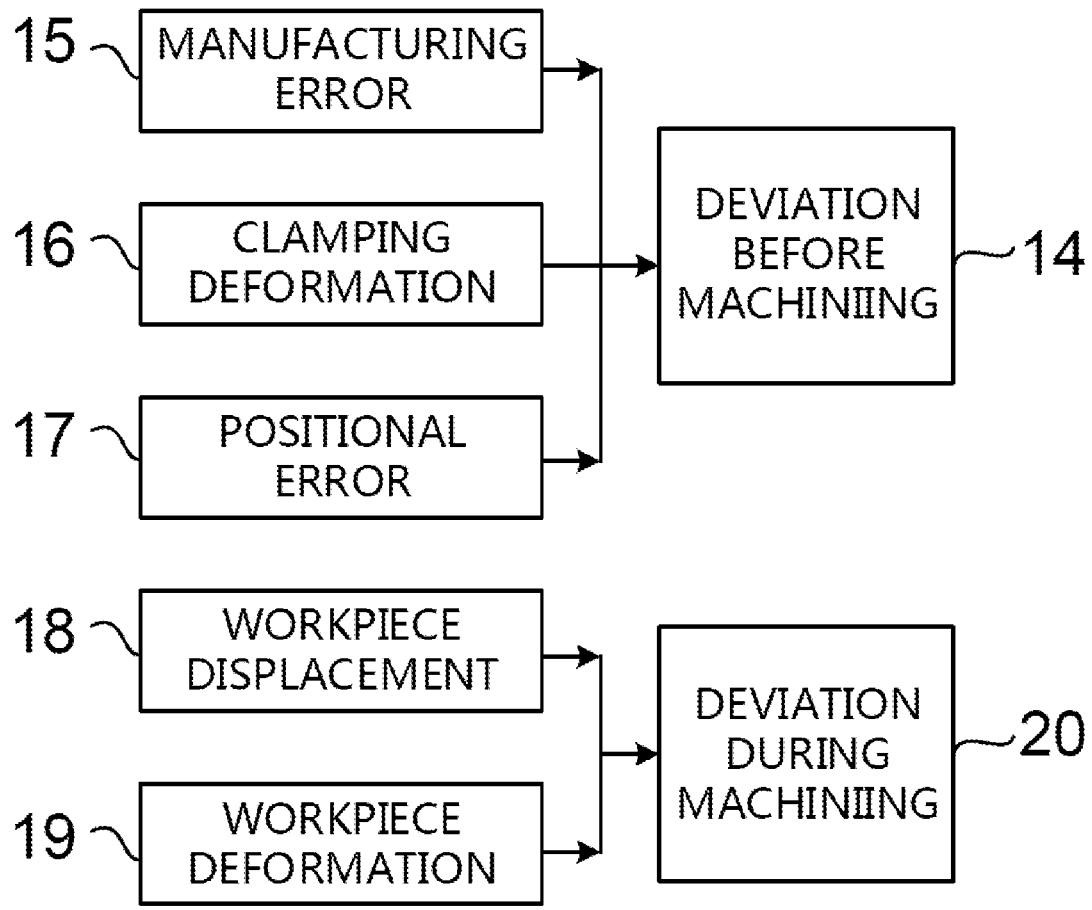
FIG. 3 depicts the deviation sources chain of cooling holes drilling process.

In general, the deviation of geometrical and positional values of the cooling holes [5] generated before and during the machining process. FIG. 3 depicts the deviation sources caused of the machining methods known from the state-of-art. The deviations can be divided into two categories. The first category is the deviation generated from the deviation before machining [14], noted as $E_b$, consisting of the manufacturing error [15] $e_i$, the clamping deformation [16] $e_c$, and the locating positional error [17] $e_l$. The second category is the deviation during machining [20], noted as $E_a$, the error related to the workpiece displacement [18] ($e_m$), and the workpiece deformation [19] ($e_d$). In this embodiment represent the displacement and deformation of the component may be generated from machining process. Therefore, the deviations generated can be described as:

$$E=E_b+E_a=(e_i+e_c+e_l)+(e_m+e_d) \quad (1)$$

To make allowance during the production of drilled holes for deviations of the geometry and positions actually produced from hole values ideally specified, the invention, need to determine each deviation as it is depicted in FIG. 3.

For the determination of manufacturing error [15] $e_i$, the manufacturing error [15] often exhibits non-uniform distribution, this is primarily due to the nonhomogeneous stress induced by different cooling rate generated by complex structures. Hence, to establish the geometrical and positional parameters of drilled hole, including the open angle of the diffuser [12] to surface tangent, the nominal thickness [9], and the position of the hole center [11], the determination of manufacturing error [15] during investment casting becomes essential.

The manufacturing error [15] depends on the integrated operation of many factors. It is not only closely related to the properties of materials having unstable compositions but also concerned with the casting structure and forming conditions. The non-uniform manufacturing error [15], also known as the displacement field, includes different deformation characteristics, consisting of shrinkage, torsion, and bending. For any point on the surface of the casting, the displacement filed $D_i$ can be described as:

$$D_i=D_{si}+D_{bi}+D_{ti} \quad (2)$$

where $D_{si}$, $D_{bi}$, and $D_{ti}$ represent the deformation characteristics of shrinkage, bending, and torsion, respectively. Since the accurate geometrical and positional parameters of cooling holes [5] significantly depend on the displacement between actual and ideal models of the high pressure gas turbine blade [1], it is essential to modeling each deformation characteristic coupled in the displacement field.

Figure 4:
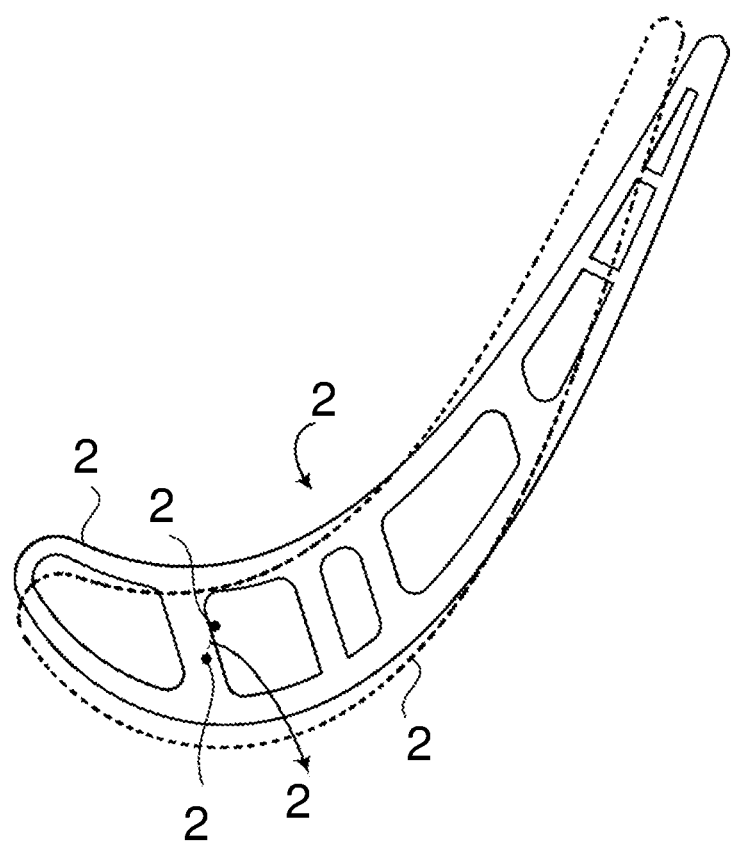
FIG. 4 depicts the schematic of torsional deformation of turbine blade.

The method for determining the torsional deformation $D_{ti}$ is described as: A series of the 2D section [21] of the high pressure gas turbine blade [1] are obtained from the ideal and actual models, illustrated in FIG. 4 as the 2D section of ideal model [25], and the 2D section of actual model [26]. In the present case, the height of the high pressure gas turbine blade [1] is 106 mm, 8 corresponding cross-sections are intercepted along the high pressure gas turbine blade [1] at the interval of 6 mm. Since torsional deformation has no effect on the geometry of 2D section [21], consequently, the 2D section [21] is regarded as rigid body, each point on the 2D section [21] has same displacement. Hence, the geometrical centroid of each 2D section [21] is chosen because the centroid location is relatively stable under changes in the discrete points. Therefore, the displacement of the geometrical centroid [24] between the geometrical centroid of actual section [22] and geometrical centroid of ideal section [23] is considered as the torsional deformation characteristic $D_{ti}$.

The determination of geometrical centroid is based on the discrete points of each 2D section [21]. Given the set of discrete points of the 2D section [21] $\{p_1, p_2, \ldots, p_n\}$, let $p_i(x_i, y_i, z_i)$ be the coordinates of the discrete points, $i=1, 2, \ldots, n$, and let M be the geometrical centroid of $p_i$, which can be expressed as:

$$M = \left(\frac{1}{n}\sum_{i=1}^{n}x_i, \frac{1}{n}\sum_{i=1}^{n}y_i, \frac{1}{n}\sum_{i=1}^{n}z_i,\right) \quad (3)$$

To determine the deformation characteristics of shrinkage and bending $D_{si}$, $D_{bi}$ in the manufacturing error [15] $e_m$, $D_{ti}$ must be eliminated and compensated. The method for compensating torsional deformation characteristic is described as:

$$P_i'=P_i+D_{ti} \quad (4)$$

where $P_i$ and $P_i'$ represent any point on the surface of 2D section of actual model [26] and the 2D section of ideal model [25] without torsional deformation, respectively. Hence, $P_c'=P_c+D_{ti}$, where $P_c$ and $P_c'$ represent the geometrical centroid of actual section [22] and the geometrical centroid of ideal section [23] without torsional deformation, respectively. Theoretically, the geometrical centroid of the 2D section of actual model [26] and the 2D section of ideal model [25] coincide, $P_c'=M_c$, after compensation.

Figure 5:
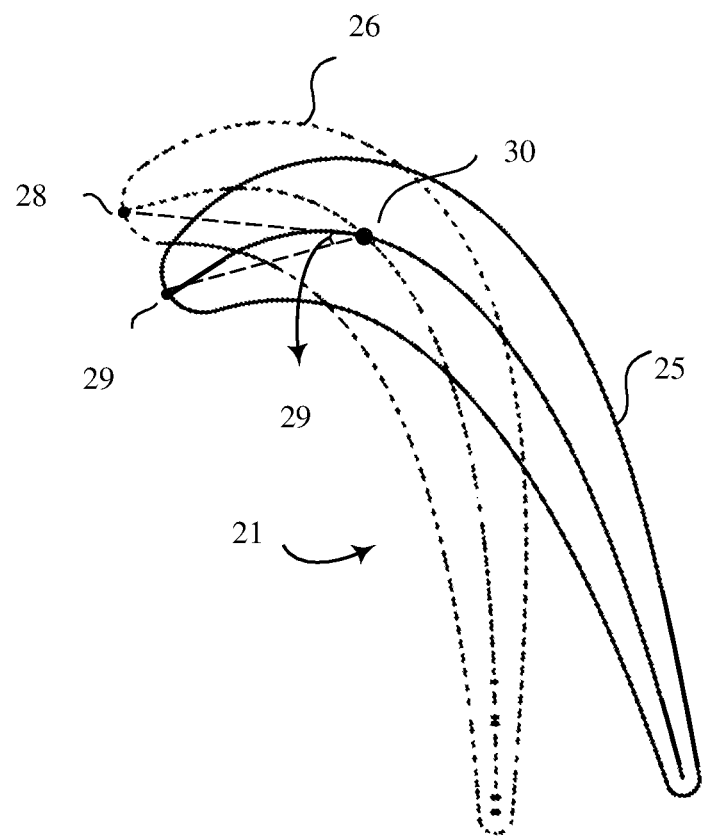
FIG. 5 shows the torsional angle representing bending deformation of turbine blade cross section.

The bending deformation characteristic $D_{ti}$ is represented by the angular displacement of the actual model relative to the ideal model, which is described by torsional angle, as illustrated in FIG. 5. The 2D section of actual model [26] and 2D section of ideal model [25] are obtained by a cross-section from the high pressure gas turbine blade [1], respectively. Here depicted in FIG. 5, the leading edge point of ideal section [29] and the leading edge point of actual section [28] are the region of high pressure gas turbine blade [1] where the gas flow first hits the blade. The torsional angle

[27] in the positive counterclockwise direction can be described as the angle formed by connecting the coincident geometrical centroid [30] $M_c$ and the leading edge point of the 2D section [21]. In FIG. 5, the geometrical centroids are coincided after compensation of the torsional deformation $D_{ti}$. Thus, the bending deformation $D_{bi}$ can be compensated using rotation transformation of the geometrical centroid [30] $M_c$, which is determined using Eq. (5).

$$P_i''=P_i'\cdot R \qquad (5)$$

where R represents the rotation matrix, and θ is the torsional angle [27].

$$R = \begin{bmatrix} \cos\theta & -\sin\theta & 0 \\ \sin\theta & \cos\theta & 0 \\ 0 & 0 & 1 \end{bmatrix} \qquad (6)$$

With the determination of torsional and bending deformation $D_{ti}$ and $D_{bi}$, the manufacturing error [15] $e_m$ of high pressure gas turbine blade [1] only contains shrinkage deformation $D_{si}$. The shrinkage deformation has important influence on the determination the nominal thickness [9] of the cooling holes [5], which can be discussed in the step of the correction of geometrical and positional parameters of cooling holes [5].

In the step, locating error $e_l$ is determined. In the fixture model, a locator is used for providing unique and accurate location in the both aspects of position and rotation with respect to a fixture reference frame. For the localization of high pressure gas turbine blade [1] prepared for cooling holes [5] drilling, a 3-2-1 locating principle is applied with 6 locators. Define $CS_w$ as the component-embedded coordinate system, a locator i (i=1, 2, . . . , 6) contacted the component surface at position $r_i$ along the surface normal $n_i$, if a small displacement of locating position δr generates the perturbations in position and rotation of the reference frame of component by δq, which $CS_w$ is transformed to $CS_w'$. According to the kinematics principle of rigid body, the relationship between δr and δq is given as:

$$\delta r = G \delta q \qquad (7)$$

where $\delta r=[\delta r_1, \delta r_2, \ldots \delta r_i, \ldots \delta r_n]^T$ is the locating positional error, specifically, $\delta r_i$ is the locating error of the locator i, which represents the distance from the nominal of the locator $n_i$ to the component surface, δq represents the coordinate transformation from $CS_w$ to $CS_w'$.

Thus, δq can be expressed as a matrix consisting of displacement derivatives of translation and rotation:

$$\delta q=[\delta x_w, \delta y_w, \delta z_w, \delta\alpha_w, \delta\beta_w, \delta\gamma_w]^T \qquad (8)$$

where $[\delta x_w, \delta y_w, \delta z_w]$ are the translation displacements of the $CS_w$ in the X, Y, and Z directions; $[\delta\alpha_w, \delta\beta_w, \delta\gamma_w]$ denote three independent angles representing the orientation of $CS_w$ relative to $CS_w'$, G is the Jacobian matrix in three-dimensional space, which is calculated as:

$$G = \begin{bmatrix} \frac{\partial f_1}{\partial x_w} & \frac{\partial f_1}{\partial y_w} & \frac{\partial f_1}{\partial z_w} & \frac{\partial f_1}{\partial \alpha_w} & \frac{\partial f_1}{\partial \beta_w} & \frac{\partial f_1}{\partial \gamma_w} \\ \frac{\partial f_2}{\partial x_w} & \frac{\partial f_2}{\partial y_w} & \frac{\partial f_2}{\partial z_w} & \frac{\partial f_2}{\partial \alpha_w} & \frac{\partial f_2}{\partial \beta_w} & \frac{\partial f_2}{\partial \gamma_w} \\ \ldots & \ldots & \ldots & \ldots & \ldots & \ldots \\ \frac{\partial f_k}{\partial x_w} & \frac{\partial f_k}{\partial y_w} & \frac{\partial f_k}{\partial z_w} & \frac{\partial f_k}{\partial \alpha_w} & \frac{\partial f_k}{\partial \beta_w} & \frac{\partial f_k}{\partial \gamma_w} \end{bmatrix} \in R^{k\times 6} \qquad (9)$$

Therefore, regarding the transformation δq, the displacement of the point on the Component surface, denoted as $e_{li}$ can be written as:

$$e_{li}=T(\delta\alpha_w)\cdot T(\delta\beta_w)\cdot T(\delta\gamma_w)\cdot R(r_i)-P_i \qquad (10)$$

where $R(r_i)=[x_i+\delta x_w, y_i+\delta y_w, z_i+\delta z_w]^T$, $P_i=[x_i, y_i, z_i]^T$, $T(\delta\alpha_w)$, $T(\delta\beta_w)$, and $T(\delta\gamma_w)$ represent the 3×3 rotation matrix in terms of three angles.

Clamping deformation, $e_c$, which is the deviation of component arising from localized elastic deformation at fixture-component contacts owing to clamping is known to affect significantly the component location accuracy. The finite-element method is employed to modeling the component-fixture contact mechanism and the surface error under the static clamping circumstances, the method for determining $e_c$ is demonstrated in FIG. 6.

Although the following example refers to nickel-based high pressure gas turbine blade [1] and stainless steel fixture system [32], the same process would apply for other materials, such as metals and alloys of metals, as would be understood by those of skill in the art. Examples of suitable materials include, but are not limited to, aluminum, magnesium, nickel, and their alloys.

In the exemplary embodiment, the workpiece CAD model [100] of the high pressure gas turbine blade [1] and the fixture system [32] are meshed by the available commercially software, such as Hypermesh from Altair Engineering, ANSYS Meshing from ANSYS Corp, etc., that can be used for modeling the meshing model [31]. For the fixture system, the contact model [33] between high pressure gas turbine blade [1] and fixture system [32] needs to be determined. Locators and clamps of the contact model [33] are assumed to have the spherical tipped shape, the contact area between component and clamps is relatively small compared to the dimensions of component-fixture system, hence, the contact region can be presumed to have the lumped contact stiffness, the deformation at the contact point can be solved by the parameters of the component-fixture system, including the radius of the locator at the contact region, the Young's modulus and the Poisson's ratio of the component and fixture materials, in this embodiment, are the Young's modulus and the Poisson's ratio of the nickel-based super-alloy and stainless steel. The meshing model [31] of high pressure gas turbine blade [1], the contact model [33], combined with the applied clamping force [34], the static model [35] can be obtained, which is used for modeling the clamping deformation [16] $e_c$.

When machining the cooling holes [5] on the sculptured surface of high pressure gas turbine blade [1] using mechanical drilling operation, the structural deformation under dynamic drilling forces could be a damageable factor to the final performance. The deviation $E_a$ caused by machining is composed of the error caused by component movement $e_m$ and component deformation $e_d$, which can be regarded as the sum of the responses both of geometric error and structural deformation.

To determine the deviation $E_a$ induced by machining process, finite-element analysis can be used. During this analysis, the high pressure gas turbine blade [1] is held firmly by the fixture system [32], the locators and clamps are modeled as rigid body with area contact, the relative deformation of the component-fixture is regard as zero due to the clamping deformation is analyzed independently.

Predicting the deformation of high pressure gas turbine blade [1] during the machining, the machining forces in a mechanical drilling operation include a torque force for tool rotation, a shear force at the cutting edge of the hole, and an axial force due to feeding. Since the forces in machining operation are time and position-dependent, the simulation is realized by a time-discrete modeling method. The machining process is divided into adequate time steps Δt, due to the short machining interval, each time step ($t_i$, $t_{i+1}$) is assumed to follow the static equilibrium condition as:

$$[K]r(t_i)=f(t_i) i=1,2,\ldots,T \quad (11)$$

where K denotes the structural stiffness matrix, $r(t_i)$ is the displacement vector, $f(t_i)$ is the vector of instantaneous force, i is the ith time step.

The instantaneous force [F] can be written as:

$$[F] = \begin{matrix} f_1(t_1) & f_1(t_2) & \ldots & f_1(t_T) \\ f_2(t_1) & f_2(t_2) & \ldots & f_2(t_T) \\ \vdots & \vdots & \vdots & \vdots \\ f_n(t_1) & f_n(t_2) & \ldots & f_n(t_T) \end{matrix} \quad (12)$$

where n represents the number of the total calculation points. In this embodiment, n is chosen as the node of the meshing model [31]. Therefore, the deviation during machining $E_a$ represented by the displacement vectors can be determined using Eq. (11) by static solution based on the available commercial finite element software package, such as ABAQUS from Dassault Group, ANSYS from ANSYS Corp, etc.

To further address the method for determining the deviations during machining process, different machining approaches need to be considered. Different machining approach has obvious different performance of the caused deviation error, for the non-traditional machining (NTM) techniques, such as electrical discharge machining (EDM), electrical discharge machining (EDM) and laser drilling processing, one of the advantages of NTM techniques is that the mechanical energy is not necessarily used to provide material removal, the generated residual stress can be minimized, hence, the deviations induced by machining process based on NTM techniques is smaller compared with the deviation caused by mechanical machining. However, the method for determining the deviations described is not intended to be limiting of the machining approach used. It can be used for the determination of deviation during different machining approaches, including, but not limit to mechanical drilling, electrical discharge machining, electrical discharge machining, laser drilling, etc.

For the purpose of production of the cooling holes [5] for the deviations $E=E_b+E_a$ determined actually produced from the ideal model of high pressure gas turbine blade [1], the geometrical and positional values of the cooling holes [5] can expediently be determined from the parametrical correlations, and transferred to the control system of the drilling apparatus.

To develop a parametric model for describing the cooling holes [5] with corrected values, three parameters need to determined: the hole center [11], $P_c$, the nominal thickness [9], T, and the open angle of the diffuser [12], α, which can be represented by the nominal of the direction of flow [7], n.

For the determination of hole center [11] $P_c$, let $CS_w$ be the global coordinate system fixed on high pressure gas turbine blade [1] without deformation. $P_c=[x_c, y_c, z_c]^T$ denotes the ideal coordinate of the hole center [11], $P^{e1}=[x^{e1}, y^{e1}, z^{e1}]^T$ is the coordinate of the hole center [11] after high pressure gas turbine blade [1] investment casting process finishes, on the basis of discussion on modeling of manufacturing error $e_m$ of high pressure gas turbine blade [1], the displacement from the hole center [11] $P_c$ to $P^{e1}$ is consist of the deformation characteristics of torsion and bending. Therefore, the coordinate transformation from $P_c$ to $P^{e1}$ can be written as:

$$P_c^{e1}=R^{e1}\cdot P_i+T^{e1}(i=1,2,\ldots,n) \quad (13)$$

where $R^{e1}$ and $T^{e1}$ represent the rotation matrix and translation matrix of the component, respectively, which can be determined by decoupling the torsional and bending deformation. i denotes the ith discrete point on the surface of component.

Deviations occur when the high pressure gas turbine blade [1] is fixed and clamped, $CS'_w$ is the component fixed coordinate system, due to locating and clamping, hole center [11] $P^{ei}$ changes to $P^{e2}$, which can be described as:

$$P_c^{e1}=R^{e1}\cdot P_i+T^{e1}(i=1,2,\ldots,n) \quad (13)$$

where $R^{e2}$ and $T^{e2}$ denote the rotation matrix and translation matrix of the component generated by locating and clamping, which can be determined by Eq. (10) and Eq. (11), respectively.

Figure 6:
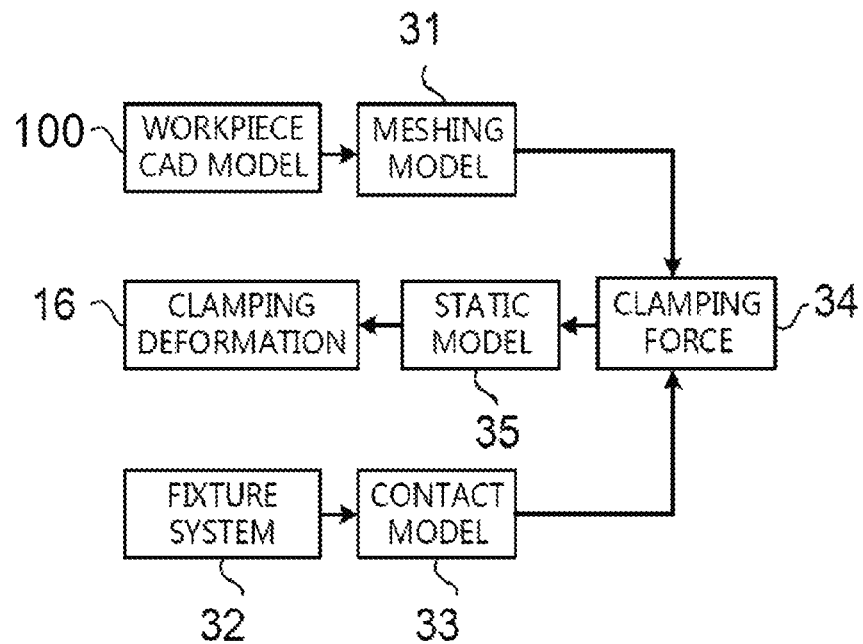
FIG. 6 shows the exemplary process for determining the clamping deformation of gas turbine blade.
Figure 7:
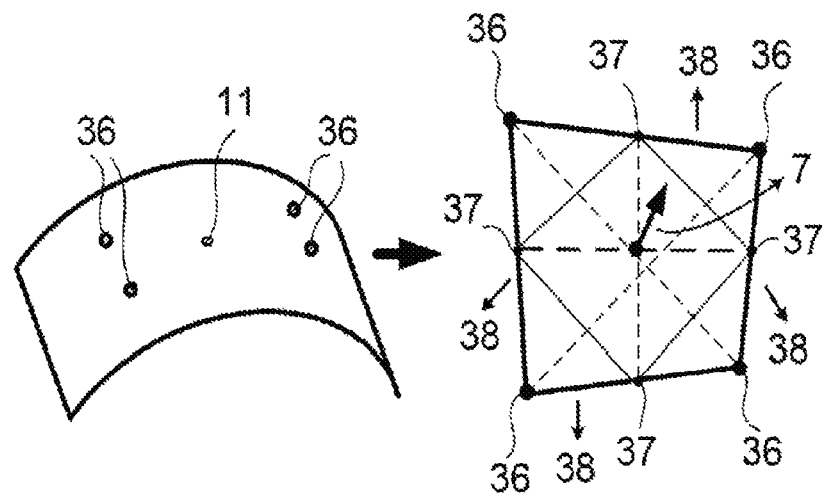
FIG. 7 shows the diagram of the calculation of normal vector of the drilled holes.

For the deviation caused by machining process, hole center [11] $P_i^{e2}$ will be changing to $P^{e3}$ which can be determined using finite-element method as illustrated in FIG. 6. Hence, the hole center [11] of the cooling holes [5] with the consideration of deviation correlation can be determined.

The method for the determination of the direction of flow [7] n of the cooling holes [5] is described as: let the neighborhood points [36]: $P_1$, $P_2$, $P_3$, and $P_4$ delineate four discrete points located in the neighborhood of the hole center [11], $M_1$, $M_2$, $M_3$, and $M_4$ are the middle points [37] of the lines [38] $P_1P_2$, $P_2P_3$, $P_3P_4$, and $P_1P_4$, respectively. Based on the basic kinematics-geometry theory, $M_1M_2$ I $P_1P_3$ I $M_3M_4$, and $M_1M_4$ I $P_2P_4$ I $M_2M_3$, furthermore, $M_1$, $M_2$, $M_3$, and $M_4$ are all lie in one plane, the normal vector n, also is the direction of flow [7], can be calculated by the vector product of the adjacent edges of the parallelogram:

$$\vec{n} = \frac{\overrightarrow{M_1M_2} \times \overrightarrow{M_2M_3}}{|\overrightarrow{M_1M_2} \times \overrightarrow{M_2M_3}|} \quad (15)$$

The actual nominal thickness [9] of the component is essential for determining the length of supply section [8], which is also the depth of the cooling holes [5]. To calculate the actual nominal thickness [9], the actual and ideal models of high pressure gas turbine blade [1] are transformed into a series of 2D cross-sectional airfoil section [2] by cutting planes perpendicular to the blade length direction, hence, the calculated nominal thickness [9] can be regarded as the distance of the intersection points between the intersecting line and curve. The method of calculating the nominal thickness [9] is described as: firstly, the outer contour of the airfoil section [2] Cω (μ) is dispersed into n points, for example, n=200, denoted by $P_i$(i=1, 2, . . . , n), the unit normal vector along the inner normal direction at each point is $N_i$(i=1, 2, . . . , n), where point $P_i$ is the starting point and $N_i$ is the direction vector. Line L can be constructed as $$L_i=P_i+tN_i(i=1,2,\ldots,n) \quad (16)$$

The parametric equation for constructing the inner profile of the airfoil section [2] is given by $$r=r(\mu) \quad (17)$$

The intersection points of line $L_i$ and inner profiles $Q_{1i}$ and $Q_{2i}$ are determined by Eq. (16) and Eq. (17). By definition, $T_i=|P_iQ_{i1}|$ is the nominal thickness [9].

To modeling the hole depth, which is represented as supply section [8], on the basis of the establishment of the actual nominal thickness [9], the deviation of nominal thickness [9] can be determined by the shrinkage deformation $D_{si}$. The non-uniform shrinkage can be represented by a scale coefficient K called shrinkage ratio, represented as:

$$K = \frac{D-M}{D} \times 100\% \qquad (18)$$

where K is the shrinkage ratio, D is the dimension of the 2D section of ideal model [25] of the high pressure gas turbine blade [1], and M is the dimension of the 2D section of actual model [26] of the high pressure gas turbine blade [1]. Therefore, the actual depth of the drilled cooling holes [5] can be determined the actual nominal thickness [9] with the consideration of the direction of flow [7].

Figure 8:
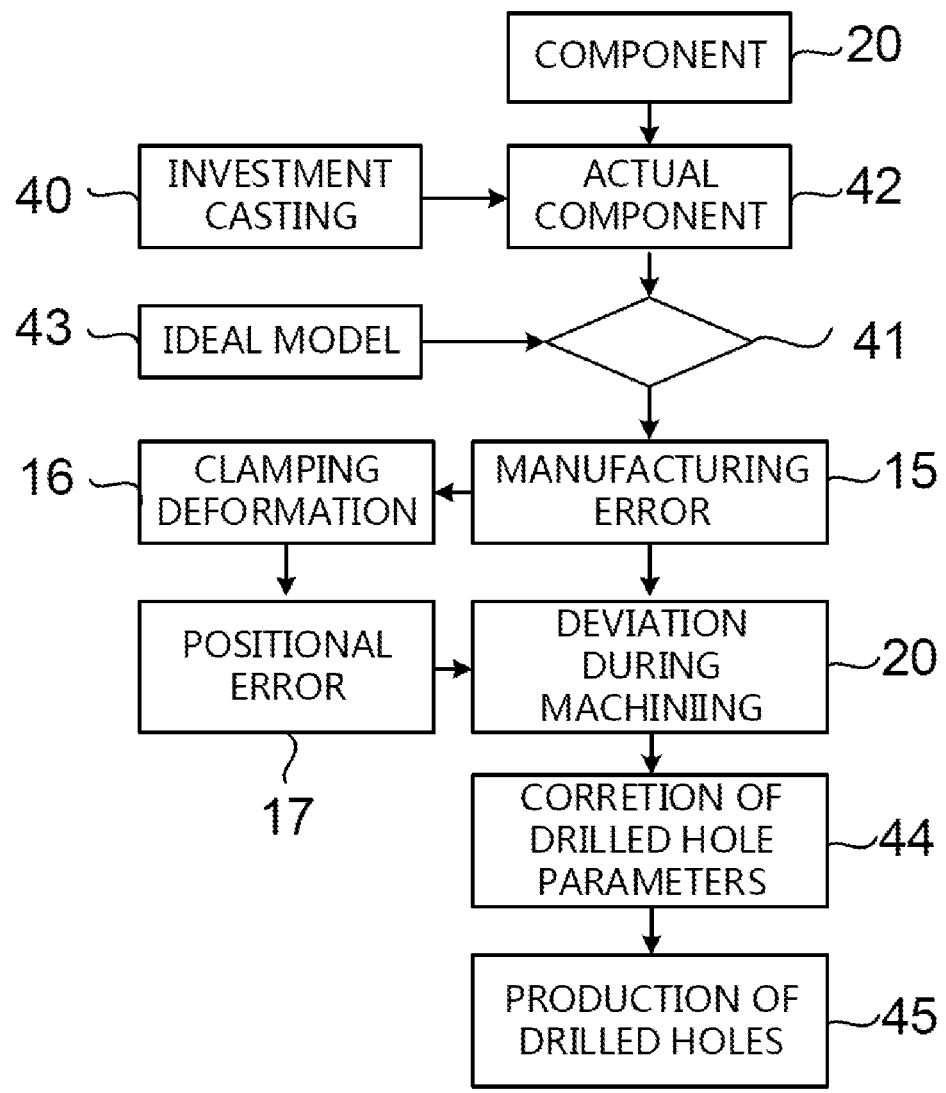
FIG. 8 shows a schematic representation of the method according to the invention for the production of drilled holes with accurate geometrical and positional values.

To make allowance during the production of the cooling holes [5] for deviations determined from the ideally specified, the invention, as it is depicted in the flow diagram schematically represented in FIG. 8. The actual component [42] including the inner and outer data, preferably hollow high pressure gas turbine blade [1] is fabricated by investment casting [40] process, the displacement between the actual component [42] and ideal model [43] is established by means of measurements [41], which is the manufacturing error [15], combined with the determined clamping deformation [16], locating positional error [17], the deviation before machining [14] can be established. Determining the deviation during machining [20] accordingly, the deviations of the geometrical and positional of the cooling holes [5] are determined. In a further method step, the data of the ideal drilled holes, which is originated from the design are consequently corrected here on the basis of the determined deviations, which is accomplished in the step of correction of drilled hole parameters [44]. Consequently, the production of drilled holes [45] with accurate geometrical and positional values can be achieved.

Having described the embodiment of the present invention in detail, it will be apparent that modifications and variations are possible without departing from the scope of the embodiment defined in the appended claims. More specifically, although some aspects of the described embodiment of the present invention are identified herein as preferred or particularly advantageous, it is contemplated that the embodiment of the present invention is not necessarily limited to these preferred aspects.

What is claimed:

1. A method for producing geometrical-parameterized drilled-holes in a wall of a component, the method comprising the following steps:
    A) providing ideal data of the drilled holes of the component, which originate from an ideal model;
    B) establishing an actual model of the component;
    C) determining a displacement of the component caused by a manufacturing process of the component;
    D) decoupling the displacement determined in step C into deformation characteristics comprising torsion, bending and shrinkage;
    E) determining a deformation of the component caused by clamping of the component and a positional error generated before machining the drilled holes, wherein determining the deformation of the component caused by clamping comprises performing a finite element analysis based on static modeling code;
    F) determining a deviation of the component induced by component movement of the component and a deviation of the component induced by component displacement of the component during a machining process;
    G) correcting geometrical and positional values of the drilled holes with consideration of the displacement established in step D, the deformation established in step E, the deviation of the component induced by component movement of the component established in step F and the deviation of the component induced by component displacement of the component established in step F; and
    H) producing the drilled holes in the wall of the component according to the geometrical and positional values after the geometrical and positional values are corrected at step G.

2. The method as claimed in claim 1 wherein the component is part of a gas or steam turbine and is made of a material selected from metals and alloys of metals.

3. The method as claimed in claim 1, wherein establishing the actual model of the component in step B comprises measuring the component using a measurement system and determining the actual model of the component in step B by a software package based on a Finite-element method.

4. The method of claim 1, wherein step E comprises applying kinematics principles of a rigid body to determine a translation and a rotation of a component-embedded coordinate system as the positional error.

5. The method as claimed in claim 1, wherein step F comprises modeling the deviations during machining process by performing a finite element analysis based on time-discrete modeling code.

6. The method as claimed in claim 1, wherein step H comprises producing the drilled holes using mechanical drilling, electrical discharge machining (EDM), electrical chemical machining (ECM), or laser beaming drilling.

7. The method as claimed in claim 1, wherein step E comprises clamping the component using a fixture system based on a 3-2-1 locating principle with 6 locators.

8. The method of claim 7, wherein, when the component is a blade of a gas turbine, clamping the component comprises clamping 1 locator on a blade platform, 2 locators on a pressure side of the blade, and 3 locators on a suction side of the blade.

9. The method as claimed in claim 1, wherein step G comprises correcting the geometrical and positional values of the drilled holes after carrying out steps C to F.

10. The method as claimed in claim 9, wherein correcting the geometrical and positional values at step G comprises steps of:
    i) correcting a position of a center of the drilled holes;
    ii) correcting a nominal vector of the drilled holes; and
    iii) correcting a depth of the drilled holes.

11. The method as claimed in claim 1, wherein step G comprises steps of:
    1) aligning the actual model and the ideal model using a registration system;
    2) cutting the actual model and the ideal model after alignment in step 1 along a height direction into at least 8 planes;
    3) dispersing each cross-section of the actual model and the ideal model into at least 200 discrete points; and
    4) computing and saving a distance between two corresponding sets of the at least 200 discrete points.

12. The method as claimed in claim 11, wherein the distance computed in step 4 is established using an equation expressed as:

$$D_i = D_{si} + D_{bi} \pm D_{ti} \qquad 5$$

where $D_{si}$ represents the deformation characteristic of shrinkage in mm, $D_{bi}$ represents the deformation characteristic of bending in mm, and $D_{ti}$ represents the deformation characteristic of torsion in mm.

13. The method as claimed in claim 12, wherein the deformation characteristic of bending is defined as an angular displacement of the actual model relative to the ideal model, expressed by torsional angle.

14. The method as claimed in claim 12, wherein the deformation characteristic of torsion comprising defining an angle formed by connecting a geometrical centroid and a leading edge point of the cross-section of the actual model.

15. The method as claimed in claim 11, comprising determining an actual wall thickness of the component using a calculation of a distance of intersection points between an intersecting line and a curve.

16. The method as claimed in claim 15, wherein determining the actual wall thickness comprises determining the actual wall thickness using a measurement system having an ability to measure the internal structure.

17. The method as claimed in claim 16, wherein the measurement system is an industrial computed tomography (CT) scanning system or a system using a finite element analysis based on thermal-mechanical coupled analyzing code.

18. A method for producing geometrical-parameterized drilled holes in a wall of a component, the method comprising the following steps:

A) providing ideal data of the drilled holes of the component, which originate from an ideal model;
B) establishing an actual model of the component;
C) determining a displacement of the component caused by a manufacturing process of the component;
D) decoupling the displacement determined in step C into deformation characteristics comprising torsion, bending and shrinkage;
E) determining a deformation of the component caused by clamping of the component and a positional error generated before machining the drilled holes;
F) determining a deviation of the component induced by component movement of the component and a deviation of the component induced by component displacement of the component during a machining process, wherein determining the deviation of the component induced by component movement of the component and the deviation of the component induced by component displacement of the component comprises modeling the deviations during machining process by performing a finite element analysis based on time-discrete modeling code;
G) correcting geometrical and positional values of the drilled holes with consideration of the displacement established in step D, the deformation established in step E, the deviation of the component induced by component movement of the component established in step F and the deviation of the component induced by component displacement of the component established in step F; and
H) producing the drilled holes in the wall of the component according to the geometrical and positional values after the geometrical and positional values are corrected at step G.

19. A method for producing geometrical-parameterized drilled holes in a wall of a component, the method comprising the following steps:

A) providing ideal data of the drilled holes of the component, which originate from an ideal model;
B) establishing an actual model of the component;
C) determining a displacement of the component caused by a manufacturing process of the component;
D) decoupling the displacement determined in step C into deformation characteristics comprising torsion, bending and shrinkage;
E) determining a deformation of the component caused by clamping of the component and a positional error generated before machining the drilled holes, wherein step E comprises clamping the component using a fixture system based on a 3-2-1 locating principle with 6 locators and when the component is a blade of a gas turbine, clamping the component comprises clamping 1 locator on a blade platform, 2 locators on a pressure side of the blade, and 3 locators on a suction side of the blade;
F) determining a deviation of the component induced by component movement of the component and a deviation of the component induced by component displacement of the component during a machining process;
G) correcting geometrical and positional values of the drilled holes with consideration of the displacement established in step D, the deformation established in step E, the deviation of the component induced by component movement of the component established in step F and the deviation of the component induced by component displacement of the component established in step F; and
H) producing the drilled holes in the wall of the component according to the geometrical and positional values after the geometrical and positional values are corrected at step G.

* * * * *